United States Patent
Cavallini

(10) Patent No.: US 9,202,121 B2
(45) Date of Patent: Dec. 1, 2015

(54) LIVENESS DETECTION

(71) Applicant: Accenture Global Services Limited, Dublin (IE)

(72) Inventor: Alessio Cavallini, Nice (FR)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/790,945

(22) Filed: Jul. 2, 2015

(65) Prior Publication Data

US 2015/0310289 A1    Oct. 29, 2015

Related U.S. Application Data

(63) Continuation of application No. 14/491,266, filed on Sep. 19, 2014, now Pat. No. 9,076,030, which is a continuation of application No. 14/048,616, filed on Oct. 8, 2013, now Pat. No. 8,848,986, which is a continuation of application No. 13/311,383, filed on Dec. 5, 2011, now Pat. No. 8,582,835.

(30) Foreign Application Priority Data

Jul. 11, 2011 (EP) ..................................... 11305905

(51) Int. Cl.
*G06K 9/62* (2006.01)
*G06K 9/00* (2006.01)

(52) U.S. Cl.
CPC ........ *G06K 9/00906* (2013.01); *G06K 9/00288* (2013.01); *G06K 9/6201* (2013.01)

(58) Field of Classification Search
None
See application file for complete search history.

(56) References Cited

U.S. PATENT DOCUMENTS

| 8,355,530 B2 | 1/2013 | Park |
| 2003/0174868 A1 | 9/2003 | Adachi et al. |
| 2008/0025576 A1* | 1/2008 | Li et al. ......................... 382/118 |
| 2009/0080715 A1 | 3/2009 | van Beek et al. |
| 2009/0135188 A1 | 5/2009 | Ding et al. |
| 2009/0219405 A1 | 9/2009 | Kaneda et al. |
| 2010/0014720 A1 | 1/2010 | Hoyos et al. |
| 2010/0158319 A1 | 6/2010 | Jung et al. |
| 2011/0188712 A1 | 8/2011 | Yoo et al. |
| 2012/0075452 A1 | 3/2012 | Ferren |

FOREIGN PATENT DOCUMENTS

| EP | 1835440 A2 | 9/2007 |
| WO | WO2006023046 A1 | 3/2006 |

OTHER PUBLICATIONS

Aai et al., Comparative Study on Blink Detection and Gaze Estimation Methods for HCI, in Particular, Gabor Filter Utilized Blink Detection Method, 2011 Eighth International Conference on Information Technology; New Generations, IEEE/DO1 10, 1109/ITNG. 2011.84, 6 pages.

(Continued)

*Primary Examiner* — Brian P Werner
(74) *Attorney, Agent, or Firm* — Fish & Richardson P.C.

(57) ABSTRACT

The present disclosure concerns a method of verifying the presence of a living face in front of a camera (112), the method including: capturing by said camera a sequence of images of a face; detecting a plurality of features of said face in each of said images; measuring parameters associated with said detected features to determine whether each of a plurality of liveness indicators is present in said images; determining whether or not said face is a living face based on the presence in said images of a combination of at least two of said liveness indicators.

20 Claims, 3 Drawing Sheets

(56) References Cited

OTHER PUBLICATIONS

Extended European Search Report from related European Application No. 11305905.9 dated Dec. 23, 2011, 9 pages.
Kollreider et al., "Verifying Liveness by Multiple Experts in Face Biometrics," Computer Vision and Pattern Recognition Workshops, 2008, CVPR Workshops 2008, IEEE Computer Society Conference ON, IEEE, Piscataway, NJ, Jun. 23, 2008, 6 pages.
Li et al., "Live Face Detection Based on the Analysis of Fourier Spectra," Proceedings—SPIE the International Society for Optical Engineering, 2004, vol. 5404, pp. 296-303.
Martin, Arnaud, "La fusion d'informations," Polycopie de cours ENSIETA—Ref.: 1484, Janvier 2005, including verified English translation, 120 pages.
Shafait et al., "Real Time Lip Motion Analysis for a Person Authentication System Using Near Infrared Illumination," Image Processing, 2006 IEEE International Conference on, IEEE, PI, Oct. 1, 2006, 4 pages.
U.S. Non-Final Office Action for U.S. Appl. No. 13/311,383 dated Apr. 24, 2013, 15 pages.
U.S. Notice of Allowance for U.S. Appl. No. 13/311,383 dated Jul. 25, 2013, 7 pages.
U.S. Final Office Action for U.S. Appl. No. 14/048,616 dated Feb. 24, 2014, 18 pages.
U.S. Notice of Allowance for U.S. Appl. No. 14/048,616 dated Jun. 4, 2014, 6 pages.
U.S. Non-Final Office Action for U.S. Appl. No. 14/491,266 dated Nov. 14, 2014, 10 pages.
U.S. Notice of Allowance for U.S. Appl. No. 14/491,266 dated Mar. 3, 2015, 5 pages.

* cited by examiner

LIVENESS DETECTION

CROSS-REFERENCE TO RELATED APPLICATIONS

This application is a continuation (and claims the benefit of priority under 35 USC 120) of U.S. application Ser. No. 14/491,266, filed Sep. 19, 2014, now allowed, which is a continuation of U.S. application Ser. No. 14/048,616, filed Oct. 8, 2013, now allowed, which is a continuation of U.S. application Ser. No. 13/311,383, filed Dec. 5, 2011, which claims priority to European Patent Application No. EP11305905, filed on Jul. 11, 2011, entitled "LIVENESS DETECTION." These prior applications are incorporated by reference in their entirety.

FIELD

The present disclosure relates to verifying the presence of a living face in front of a camera.

BACKGROUND

The use of biometric data for automatically verifying the identity of individuals is becoming increasingly common. Indeed, sophisticated computer algorithms are now available for automatically determining a match between registered biometric data and newly acquired biometric data captured by a suitable input device.

A common type of biometric data used for identity verification is an image of the face. Indeed, passports, identity cards, driving licenses and other identity documents nearly always include a photo of the document holder. It has been proposed to provide machines that can capture an image of the document holder, and compare this image with a registered image of the identity document to automatically identify the document holder.

However, fraudsters may be able to trick such machines by holding a photo of the document holder in front of the camera instead of presenting their own face. There is thus a need for an effective method and device for verifying that an image of a face captured by a camera is indeed a living face and not simply a photograph.

SUMMARY

It is an aim of embodiments of the present disclosure to at least partially address one or more needs in the prior art.

According to one aspect of the present disclosure, there is provided a method of verifying the presence of a living face in front of a camera, the method comprising: capturing by said camera a sequence of images of a face; detecting a plurality of features of said face in each of said images; measuring parameters associated with said detected features to determine whether each of a plurality of liveness indicators is present in said images; determining whether or not said face is a living face based on the presence in said images of a combination of at least two of said liveness indicators.

According to one embodiment, determining whether each of a plurality of liveness indicators is present in said images comprises determining a parameter score for each of said liveness indicators based on said measured parameters and comparing each of said parameter scores with at least one threshold.

According to another embodiment, determining whether or not said face is a living face comprises: generating an intermediate score based on the determined presence of each of said liveness indicators; adjusting said intermediate score if the presence of said combination of at least two liveness indicators is detected in said images; and comparing said adjusted score with at least one threshold value.

According to another embodiment, the presence in said images of said combination of said at least two of said liveness indicators is detected based at least on a measure of the extend of eye blinking in said images and on a measure of the change in the face proportions in said images.

According to another embodiment, determining that said face is a living face is also based on the presence in said images of a combination of at least two further liveness indicators detected based at least on a measure of the eye gaze direction in said images and on a measure of the extend of mouth opening in said images.

According to another embodiment, the presence in said images of said combination of said at least two of said liveness indicators is detected based at least on a measure of the eye gaze direction in said images and on a measure of the extend of mouth opening in said images.

According to a further aspect of the present disclosure, there is provided a computer readable medium storing a computer program that, when executed by a processor, causes the above method to be executed.

According to a further aspect of the present disclosure, there is provided a device for verifying the presence of a living face in front of a camera, device comprising: an input for receiving a sequence of images of a face captured by said camera; a processor configured to: detect a plurality of features of said face in each of said images; measure parameters associated with said detected features to determine whether each of a plurality of liveness indicators is present in said images; and determine whether or not said face is a living face based on the presence in said images of a combination of at least two of said plurality of liveness indicators.

According to one embodiment, said device is a document checkpoint.

According to another embodiment, the device further comprises a reading element for reading biometric data from a passport, said biometric data comprising a registered image of the face of the passport holder, wherein said processor is further configured to compare said registered image with at least one of said sequence of images if said face is determined to be a living face.

In general, one aspect of the subject matter described in this specification may be embodied in methods that include the actions of generating a first and second images of a face using a camera; generating a first value for one or more facial features of the face by measuring an attribute of the facial features in the first image; generating a second value for the facial features by measuring the same attribute of the facial features in the second image; generating a comparison value for the facial features based on the first value and the second value; comparing the comparison value for the facial features to a predetermined threshold; and based upon comparing the comparison value for the facial features to the predetermined threshold, determining that the face in the first or second images is (i) a picture of a face or (ii) a face of a person actually positioned in front of the camera.

According to one embodiment, the determining comprises: identifying one or more features based in part on whether the comparison value for the feature satisfies the predetermined threshold; calculating an overall score using the identified features; and comparing the overall score to a second predetermined threshold.

According to another embodiment, the identified features are assigned individual weights, and wherein the individual weight for a facial feature is determined based at least in part on a comparison of the comparison value for the facial feature and the corresponding threshold value.

According to another embodiment, the methods include the actions of: in a case where two or more features are identified: calculating one or more combination scores for the identified features where the identified features satisfy one or more specified combinations; and adjusting the overall score using the one or more combination scores.

According to another embodiment, the specified combinations and corresponding combination scores are determined using machine learning techniques.

According to another embodiment, measuring an attribute of the facial features comprises measurement of at least one of the following features: eye distance, face proportion, opening of the mouth, eye gaze, and eye blinking.

Another aspect of the subject matter described in this specification may be embodied in systems comprising: one or more computers programmed to perform operations comprising: generating a first and second images of a face using a camera; generating a first value for one or more facial features of the face by measuring an attribute of the facial features in the first image; generating a second value for the facial features by measuring the same attribute of the facial features in the second image; generating a comparison value for the facial features based on the first value and the second value; comparing the comparison value for the facial features to a predetermined threshold; and based upon comparing the comparison value for the facial features to the predetermined threshold, determining that the face in the first or second images is (i) a picture of a face or (ii) a face of a person actually positioned in front of the camera.

According to one embodiment, the determining comprises: identifying one or more features based in part on whether the comparison value for the feature satisfies the predetermined threshold; calculating an overall score using the identified features; and comparing the overall score to a second predetermined threshold.

According to another embodiment, the identified features are assigned individual weights, and wherein the individual weight for a facial feature is determined based at least in part on a comparison of the comparison value for the facial feature and the corresponding threshold value.

According to another embodiment, the system further comprises: in a case where two or more features are identified: calculating one or more combination scores for the identified features where the identified features satisfy one or more specified combinations; and adjusting the overall score using the one or more combination scores.

According to another embodiment, the specified combinations and corresponding combination scores are determined using machine learning techniques.

According to another embodiment, measuring an attribute of the facial features comprises measurement of at least one of the following features: eye distance, face proportion, opening of the mouth, eye gaze, and eye blinking.

Another aspect of the subject matter described in this specification may be embodied in a computer storage medium encoded with a computer program, the program comprising instructions that when executed by data processing apparatus cause the data processing apparatus to perform operations comprising: generating a first and second images of a face using a camera; generating a first value for one or more facial features of the face by measuring an attribute of the facial features in the first image; generating a second value for the facial features by measuring the same attribute of the facial features in the second image; generating a comparison value for the facial features based on the first value and the second value; comparing the comparison value for the facial features to a predetermined threshold; and based upon comparing the comparison value for the facial features to the predetermined threshold, determining that the face in the first or second images is (i) a picture of a face or (ii) a face of a person actually positioned in front of the camera.

According to one embodiment, the determining comprises: identifying one or more features based in part on whether the comparison value for the feature satisfies the predetermined threshold; calculating an overall score using the identified features; and comparing the overall score to a second predetermined threshold.

According to another embodiment, the identified features are assigned individual weights, and wherein the individual weight for a facial feature is determined based at least in part on a comparison of the comparison value for the facial feature and the corresponding threshold value.

According to another embodiment, the computer storage medium further comprises: in a case where two or more features are identified: calculating one or more combination scores for the identified features where the identified features satisfy one or more specified combinations; and adjusting the overall score using the one or more combination scores.

According to another embodiment, the specified combinations and corresponding combination scores are determined using machine learning techniques.

According to another embodiment, measuring an attribute of the facial features comprises measurement of at least one of the following features: eye distance, face proportion, opening of the mouth, eye gaze, and eye blinking.

The details of one or more embodiments are set forth in the accompanying drawings and the description below. Other potential features and advantages will become apparent from the description, the drawings and the claims.

BRIEF DESCRIPTION OF THE DRAWINGS

The foregoing and other purposes, features and aspects of the disclosure will become apparent from the following detailed description of example embodiments, given by way of illustration and not limitation with reference to the accompanying drawings, in which.

Throughout the figures, like features have been labelled with like reference numerals.

DETAILED DESCRIPTION

Figure 1:
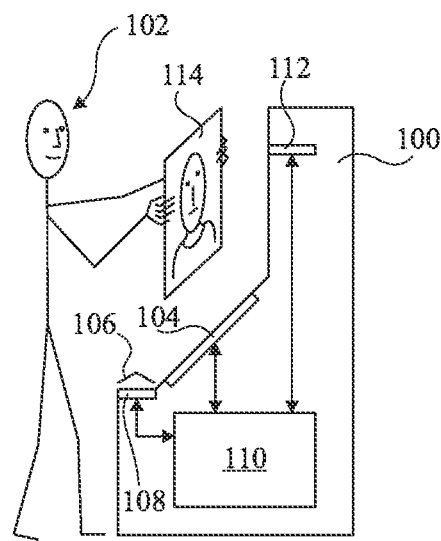
FIG. 1 illustrates a document checkpoint according to an example embodiment.

FIG. 1 illustrates a document checkpoint 100 for automatically verifying the identity of a document holder 102.

Checkpoint 100 for example includes a display 104, through which a user 102 is invited to present an identity document 106, such as a passport or ID card, to a document reader 108. For example, the identity document 106 may include an RF (radio frequency) tag or other chip that is wirelessly accessible and stores biometric data including an image of the face of the document holder. The reader 108 for example communicates with the RF tag or chip of the identity document 106 in order to retrieve the biometric data. Alternatively or additionally, the reader 108 may optically scan a photo present on the identity document 106.

Whatever the form of the reader 108, the biometric data, and in particular the image of the face of the document holder, is retrieved from the identity document 106 and stored in a memory of an image verification device 110 of checkpoint 100. The image verification device 110 is for example also in communication with the display 104, and with a camera 112, which is arranged to capture a sequence of images of the face of the user 102.

As shown in FIG. 1, rather than presenting their own face to the camera 112, the user 102 may not be the authorized document holder of identity document 106, and may present a photo 114 matching the photo of the identity document 106 to the camera 112. Furthermore, the user 102 may perform some actions, such as bending the photo, in order to give the impression of a living and moving face. Alternatively, the fraudster may present to the camera 112 a photo displayed on the screen of an electronic display device, such as a smart phone or tablet computer. According to the example embodiments described herein, the image verification device 110 is able to determine that the camera 112 is seeing a photo or reproduction of the face and not a living face directly, as will be described in more detail below.

Throughout the present application, verifying that a living face is in front of a camera means verifying that the image of the face captured by the image sensor of the camera is not the result of a reproduction. In particular, the image does not result from a 2-dimensional printed or displayed image of a face held in front of a camera, but results from a 3-dimensional, flesh and blood, living face that is directly presented in front of the camera.

Figure 2:
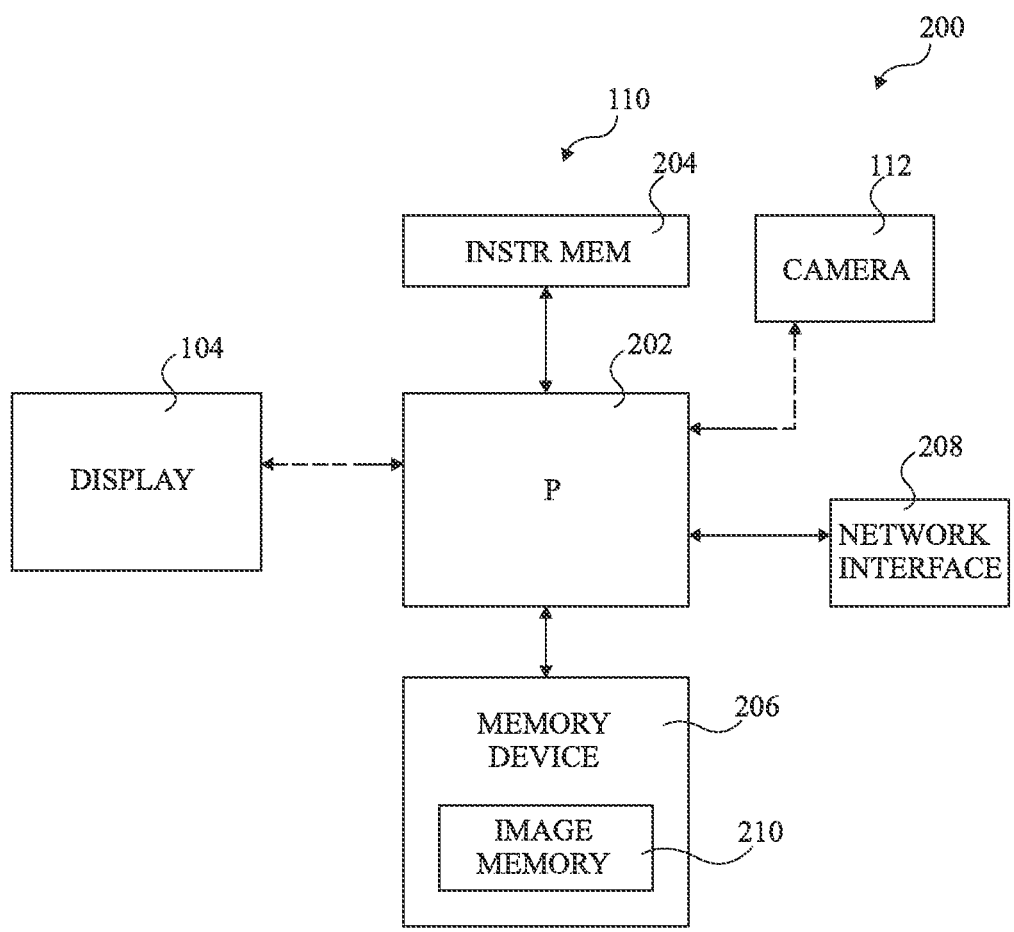
FIG. 2 schematically illustrates an image verification device for automatically verifying the presence of a live face in front of a camera according to an example embodiment.

FIG. 2 illustrates an apparatus 200 that is suitable for implementing the embodiments of the present disclosure. In particular, the apparatus 200 for example includes the display 104, camera 112 and image verification device 110 of FIG. 1. The display 104 is for example a touch screen, which permits the user 102 to perform selections and enter data. Additionally or alternatively, an input keyboard, mouse or other type of input device may be provided.

The image verification device 110 is for example implemented by a general purpose computer or similar processing platform, and includes a processor 202 in communication with an instruction memory 204, memory device 206 and in some embodiments a network interface 208. The processor 202 is also in communication with the display 104 and camera 112. The processor 202 may include a microprocessor, microcontroller, digital signal processor, or appropriate combinations thereof, and executes instructions stored in the instruction memory 204, which could be a volatile memory such as DRAM (dynamic random access memory), or another type of memory. The memory device 206 is for example a non-volatile memory, such as a hard disk drive or FLASH drive, and for example includes an image memory portion 210 for storing facial images captured by camera 112 and/or retrieved from the identity document 106. The network interface 208 may for example provide a wired or wireless connection to a communications network such as the internet, allowing, for example, updates to the programs stored by instruction memory 204 to be downloaded, and an alert to be sent to a central control post in the case that the presence of a photo in front of camera 112 is detected.

FIGS. 3A to 3E each represent a same image of a face and show examples of parameters of facial features that can be measured to verify the liveness of the face according to the embodiments described herein. In particular, the verification of each parameter based on such facial features indicates whether or not the corresponding liveness indicator is present, which in turn indicates that the camera is viewing a living face. The facial features are for example measured in a sequence of at least five images.

The evaluation of the liveness indicators of FIGS. 3A to 3E for example first involves the detection of certain facial features in each of the captured images. This detection will be within the capabilities of those skilled in the art. For example, face detection based on feature detection is discussed in more detail in the document "Fast Asymmetric Learning for Cascade Face Detection" Jianxin Wu et al., the contents of which is hereby incorporated by reference to the extent permitted by the law.

Figures 3A, 3B, 3C, 3D, 3E:
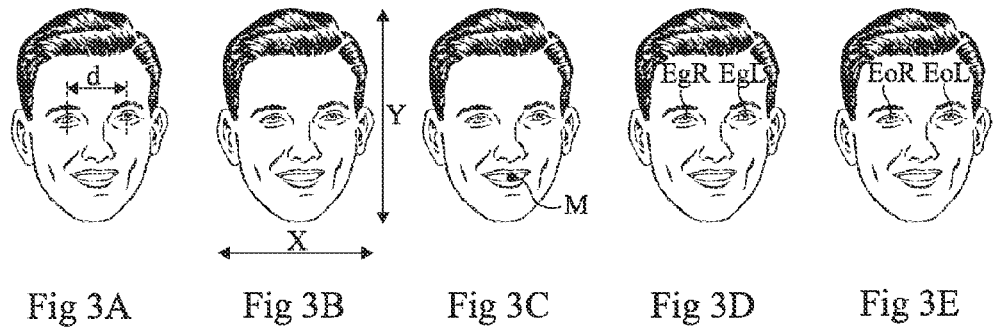
FIGS. 3A to 3E are facial images showing parameters that may be measured to detect the presence of liveness indicators in a sequence of images according to an example embodiment.

As represented in FIG. 3A, one face liveness indicator is based on the measured distance been the pupils of the eyes, which should not vary much in a sequence of images of the face. Relatively high variations in this distance could indicate that a photo is being bent to give the impression of a living face. For example, after detecting two eyes in the face of each of the sequence of images, the distance d between the pupils of the eyes is measured to provide a series of measurements $d_1$ to $d_N$, where N is the number of images in the sequence. The measurements are analysed to ensure that the distance between the eyes does not fluctuate too much, for example by more than a few millimeters from the average distance between the eyes. For example, by taking the standard deviation of the distances $d_1$ to $d_N$, a parameter score $S_{ED}$ can be determined, and compared to a threshold value $TH_{ED}$ to evaluate the extent of variation of the distance been the eyes. The threshold value could for example equal a few millimeters. The following equation is for example used to provide the parameter score $S_{ED}$ for eye distance:

$$S_{ED}(d_1, d_N)$$

where $\sigma(d_1, d_N)$ is the standard deviation of the range of measurements from $d_1$ to $d_N$.

As represented in FIG. 3B, another face liveness indicator is based on the proportions of the face, which again should not vary much in the sequence of images. The contour of the face is for example detected, with or without the hair, to provide a series of width measurements $X_1$ to $X_N$ and height measurements $Y_1$ to $Y_N$ of the face in the sequence of N images. A ratio between the X and Y measurements is then for example determined, such as by dividing each X measurement by the corresponding Y measurement, and it is verified that these ratios do not vary too greatly, for example not more than 5 percent from the average. For example, taking the standard deviation of these ratios, a parameter score $S_{FP}$ can be determined, and compared to a threshold value $TH_{EA}$ to evaluate the extent of variation of proportions of the face. The following equation is for example used to provide the parameter score $S_{FP}$ for the face proportions:

$$S_{FP} = \sigma(X_1/Y_1, X_N/Y_N)$$

where $\sigma(X_1/Y_1, X_1/X_N)$ is the standard deviation of the range of ratios from $X_1/Y_1$ to $X_N/Y_N$.

As represented in FIG. 3C, another face liveness indicator is based on the extent of mouth opening, which for example is likely to vary at least a certain amount if the face is a living face. Once the feature of the mouth has been detected, the separation between the lips is for example detected in each image to provide measurements $M_1$ to $M_N$. It is then verified whether there is at least a minimum movement of the mouth. For example, the standard deviation of the measurements $M_1$ to $M_N$ provides a parameter score $S_{MO}$ that can be compared with a threshold value $TH_{MO}$ to evaluate the extent of mouth movement. For example, the threshold $TH_{MO}$ could be around one or two millimeters. The following equation is for example used to provide the parameter score $S_{MO}$ for the extent of mouth opening:

$$S_{MO}=\sigma(M_1,M_N)$$

where $\sigma(M_1,M_N)$ is the standard deviation of the range of measurements from $M_1$ to $M_N$.

As represented in FIG. 3D, another face liveness indicator is based on eye gaze, which should for example stay within certain limits. In the case that the eye gaze exceeds these limits, for example if the gaze stays very rigid, or if it varies beyond normal margins, this could indicate that a photo has been placed in front of the camera, and is for example being bent. For example, the direction of eyes gaze is evaluated for each eye independently to provide measurements $EgL_1$ to $EgL_N$ for the left eye in the sequence of images, and measurements $EgR_1$ to $EgR_N$ for the right eye in the sequence of images. Methods for gaze tracking are for example described in more detail in the publication titled "Eye Tracking in Human-Computer Interaction and Usability Research: Ready to Deliver the Promises", Jacob et al., which is herein incorporated by reference to the extent determined by the law. Then the following equation is for example used to provide a parameter score $S_{EG}$ for the eye gaze:

$$S_{EG}=|\sigma(EgR_1,EgR_N)-\sigma(EgL_1,EgL_N)|$$

where $\sigma(EgR_1,EgR_N)$ is the standard deviation of the range of values from $EgR_1$ to $EgR_N$ for the right eye, and $\sigma(EgL_1, EgL_N)$ is the standard deviation of the range of values from $EgR_1$ to $EgR_N$ for the left eye. The modulus of the result of the subtraction of the standard deviations is for example calculated by squaring and then taking the square root of the result. This parameter score $S_{EG}$ is for example compared with lower and upper thresholds $LTH_{EG}$ and $HTH_{EG}$ respectively to verify that the eye gaze is within acceptable margins.

As represented in FIG. 3E, another face liveness indicator is based on the number of times the eyes blink, which for example would normally occur at least once or twice during the period that the images are captured, depending on the duration on this period. Eye tracking and blink detection is for example discussed in more detail in the publication titled "Real Time Eye Tracking and Blink Detection with USB Cameras", Michael Chau et al., the contents of which is hereby incorporated by reference to the extent permitted by the law. For example, the eyes are detected, and the extent to which the left and right eye is open in each image is evaluated to provide measurements $EoR_1$ to $EoR_N$ for the right eye and $EoL_1$ to $EoL_N$ for the left eye. For example, the distance between the upper and low eye lids is measured. Then the eye blinking parameter score $S_{EB}$ is evaluated as the number of images of the sequence in which one or the other eye is open, for example using the equation:

$$S_{EB} = \sum_{k=1}^{N} [IfCount(EoR_k > y, 1, 0) + IfCount(EoL_k > y, 1, 0)]$$

where IfCount(x,1,0) is a function having a value 1 if x is true and a value 0 if x is false, and y is a threshold value above which the eyes are considered open, equal for example to 3 or 4 millimeters. For example, the parameter score $S_{EB}$ is then compared with a threshold $TH_{EB}$ for example equal to 1 or 2.

It should be noted that the examples of FIGS. 3A to 3E are only a few of the possible liveness indicators that could be evaluated in the sequence of images. In alternative embodiments, only some of these measurements could be performed, and/or additional measurements could be performed, for example based on other detected features of the face.

Figure 4:
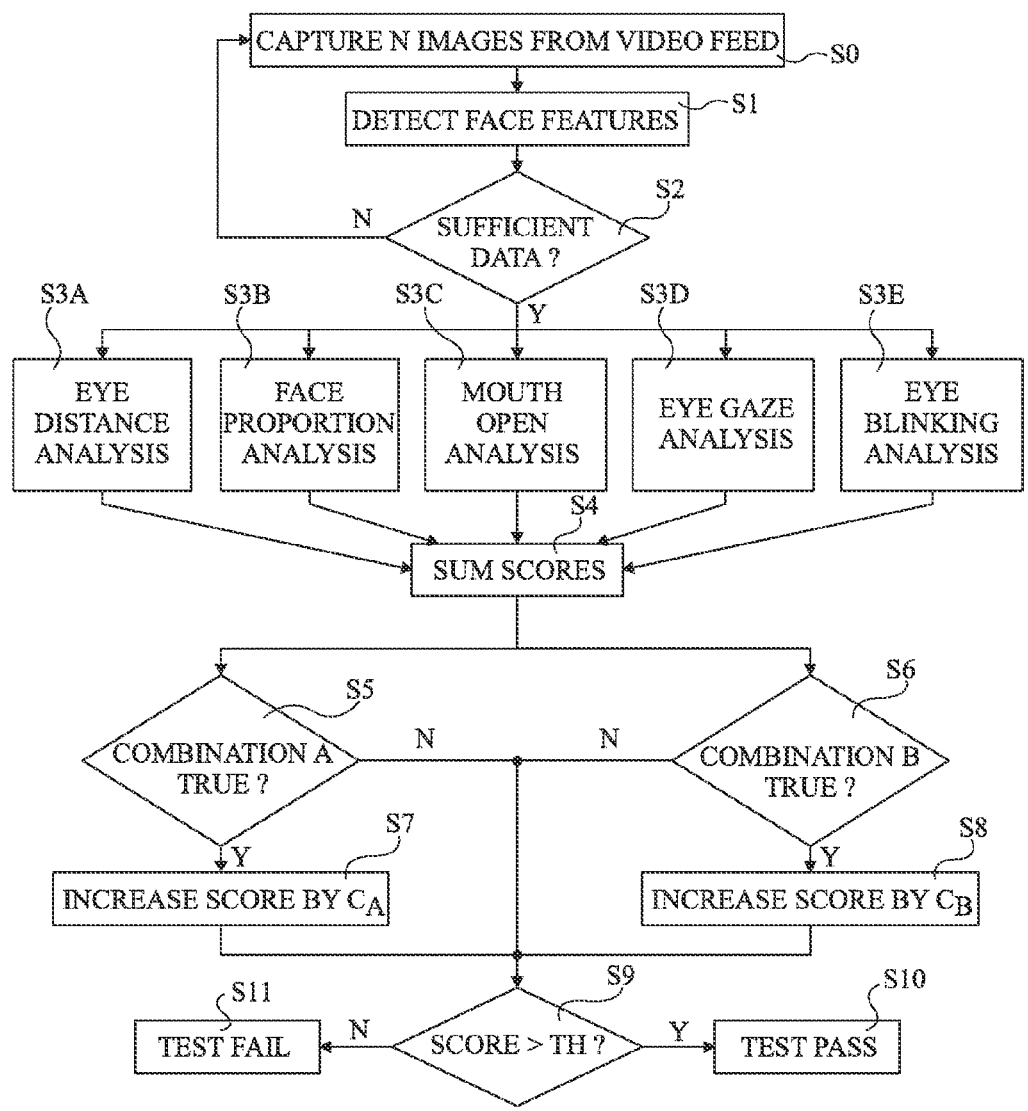
FIG. 4 is a flow diagram showing operations in a method of verifying the presence of a living face in front of a camera according to an example embodiment.

FIG. 4 is a flow diagram illustrating operations in a method of verifying the presence of a living face in front of a camera according to one example. These operations are for example implemented by the processor 202 of FIG. 2 under the control of the instructions of the instruction memory 204.

In a first operation S0, a sequence of N images are captured by camera 112 of FIG. 2. For example, the camera 112 provides a video feed from which the sequence of images are extracted. The number of images N is for example at least 5, and could be as high as several hundred. The camera 110 takes N images every M seconds, such that it takes M seconds to capture all of the images. For example, M is between 1 and 20 seconds. In some cases, not all of the images captured by the camera are used for the liveness detection, as some images may be filtered out, if for example they are of poor quality, such as being blurred due to a movement of the user.

In a subsequent operation S1, face features are detected in two or more of the N images. The particular face features that are detected will depend on the liveness indicators to be evaluated in the images, but in the present example the features are the eyes, the contour of the face and the mouth.

In a subsequent operation S2, it is checked whether or not there is sufficient data in the captured images. For example, if it has not been possible to detect one or more of the facial features in some of the captured images, it may be considered that the process should be repeated by returning to operation S0, and for example displaying a message to the document holder reminding them to face the camera and remain still.

If there is sufficient data, the next operations are S3A to S3E, which may be performed in parallel as illustrated in FIG. 4, or at least partially in series. Operations S3A to S3E for example correspond to evaluating the presence of the liveness indicators described above in relation to FIGS. 3A to 3E respectively. Each of these operations involves determining a parameter score relating to a corresponding liveness indicator, and comparing this score with a corresponding threshold to provide a feature evaluation result, which is for example "TRUE" or "FALSE" result. For example, none of the tests alone conclusively determines that the face is a living face, but a "TRUE" result means that the corresponding test collaborates this hypothesis due to the presence of this liveness indicator, whereas a "FALSE" result means that the corresponding test collaborates the opposite hypothesis that the face is not a living face, due to the absence of this liveness indicator.

For example, the eye blinking indicator is considered to be true if the eye blinking score $S_{EB}$ is greater than the threshold $TH_{EB}$. Similarly, the eye distance indicator is for example found to be true if the eye distance score $S_{ED}$ is less than $TH_{ED}$, where $TH_{ED}$ is a high threshold. The face proportion indicator is for example considered true if the face proportion score $S_{FP}$ is less than $TH_{FP}$, where $TH_{FP}$ is a high threshold. The mouth open indicator is for example considered true if the mouth open score $S_{MO}$ is greater than $TH_{MO}$, where $TH_{MO}$ is a low threshold. The eye gaze indicator is for example found to be true if the eye gaze score is in the range $LTH_{EG}<S_{EG}<HTH_{EG}$, where $LTH_{EG}$ and $HTH_{EG}$ are low and high thresholds respectively. In a next operation S4, scores are calculated and summed based on the feature evaluation results determined in operations S3A to S3E. For example, this involves simply adding 1 to the sum for every "TRUE" result, and nothing for every "FALSE" result. Alternatively, appropriate weightings are applied to each of the results, for example depending on the importance of the particular liveness indicator to a correct evaluation of the living face. In one example, the operations S3A to S3E are associated with weightings of 20, 15, 10, 30 and 20 respectively, and thus for every feature evaluation result that is "TRUE", the corresponding weighting is summed in operation S4 to provide a summed score. As one example, if operations S3A, S3B and S3E return a "TRUE" result, and the other operations a "FALSE" result, the score would be 55.

The subsequent operations are S5 and S6, which again may be performed in parallel as shown in FIG. 4, or at least partially in series.

Operation S5 involves determining whether a combination A of liveness indicators is true. The combination A is for example that the eye blinking score and the face proportion score are both true. If so, the next operation is S7, in which the summed score determined in S4 and potentially S8 is increased by a fixed amount $C_A$. Alternatively, the summed score could be increased by an amount depending on the product of the parameter scores for each of the liveness indicators of combination A.

Operation S6 involves determining whether a combination B of liveness indicators is true. For example, combination B is that eye blinking, eye gaze and mouth open scores are all true. If so, the next operation is S8, in which the summed score determined in operation S4 and potentially in S7 is incremented by a fixed amount $C_B$. Alternatively, the summed score could be increased by an amount depending on the product of the parameter scores for each of the liveness indicators of combination B.

In alternative embodiments, other liveness indicators could form the combinations A and B of operations S5 and S6.

After operations S7 and S8, the next operation is S9, in which the total score determined in operations S4, S7 and S8 is compared with a threshold value TH, and if the threshold is exceeded, the next operation is S10 in which it is determined that the image sequence has passed the test and can be considered to relate to a living face, whereas if the threshold is not exceeded, the next operation is S11, in which it is determined that the image sequence has failed the test. In the latter case, an error message may be displayed on display 104 of FIGS. 1 and 2, and in some cases security personnel may be informed, via the network interface 208 of FIG. 2, such that a manual verification of the identity document can be performed.

The threshold TH is for example programmed by a user to provide an acceptable low rate of false positive and false negative evaluations. For example, this could correspond to a score that requires at least one of the combinations A and B to be true, and at least three of the features results to be true. In some cases, the system could automatically determine the threshold TH based on test data for which it knows whether or not a captured image is of a living face.

While not illustrated in FIG. 4, in parallel with or after verifying that the face in the image sequence is a living face, the face is for example compared to the image of the identity document, and if there is a match, the user 102 is for example permitted to access a restricted area, for example an airport departure lounge. For example, the document checkpoint 100 of FIG. 1 may comprising an automatic barrier, that is opened only if a living face of the user 102 is found to match the registered image of the identity document.

It will be apparent to those skilled in the art that the method represented in FIG. 4 could be subject to numerous variations. For example, in some cases the operation S4 could be skipped, and instead the test could be considered to be passed only if the combination A and/or B of liveness indicators is found to be true. Furthermore, the scores calculated in operation S4 could be calculated differently. For example, rather than using a "TRUE" or "FALSE" result from each of the liveness indicators tested in operations S3A to S3E, the parameter scores calculated for each "TRUE" liveness indicator could summed, for example after normalization.

An advantage of the embodiments described herein is that, by determining that a face is a living face in front of a camera based on the presence of a combination liveness indicators in the images, a high success rate can be achieved, with few false positive and false negatives. Furthermore, such an algorithm can be evaluated particularly quickly, ensuring a fast response time of the liveness verification device. This is of importance as an objective in such systems is generally to verify the identity in as fast a time as possible, to avoid long queues of users wishing to have their identity documents verified.

While a number of particular embodiments have been described, it will be apparent to those skilled in the art that numerous modifications may be applied.

For example, it will be apparent to those skilled in the art that the method described herein could be implemented entirely in software, entirely in hardware, or by a combination of software and hardware.

Furthermore, while two advantageous examples of the combinations A and B of liveness indicators have been described, it will be apparent to those skilled in the art that alternative combinations of liveness indicators could be evaluated, and/or only one or the other of the combinations A and B could be evaluated to determine the presence of a living face.

Furthermore, it will be apparent to those skilled in the art that the various features of the embodiments described herein could be combined in any combination.

Figure 5:
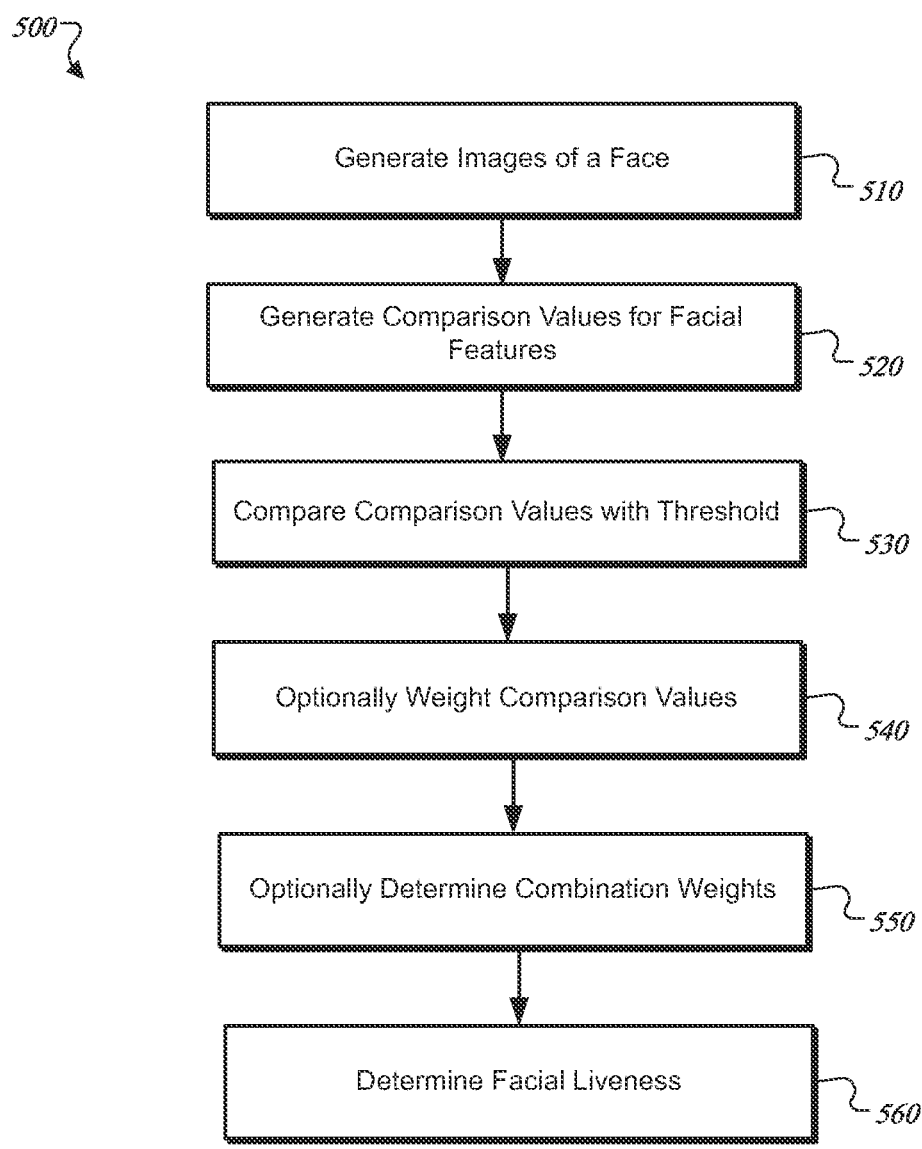
FIG. 5 is a flow diagram showing operations in a method according to a further example embodiment.

FIG. 5 is a flowchart of an example process for determining a liveness score calculation. For convenience, the method 500 is described in reference to a system of one or more computers that perform the steps of the method. The system can be, for example, the system 200 described above with reference to FIG. 2.

The system generates images of a face using an image processing apparatus (e.g., a video camera) (510). The image processing apparatus can be used to capture two or more images of a face positioned in front of the apparatus. In some implementations, the number of images captured is adjusted based on the quality of each captured image. For example, additional images may be captured if the quality of an image makes it difficult to analyze facial features in the image.

The system generates a comparison value for one or more facial features of the face by measuring an attribute of the facial features across two or more images (520). Measurement of facial features can be accomplished using various face detection techniques (e.g., eye distance detection techniques, face proportion detection techniques, techniques for measuring variations in mouth opening, techniques for measuring changes in eye gaze, and techniques for measuring eye blinking). Further, in some implementations, measurements for two or more facial features are performed in parallel.

In some implementations, the attribute measured is based on a distance between the pupils of the eyes, where the distance between the pupils of the eyes is measured. The standard deviation of the measured distances can be used to determine an eye distance comparison value. For example, relatively high variations in eye distance may indicate a picture (e.g., photograph) of a face that is being bent in front of the image processing apparatus to give the illusion of an actual living face being positioned in front of the image processing apparatus.

In some other implementations, the attribute measured is based on proportions of a face, where the contour of the face is measured to provide a width and height the face across an image sequence. In particular, a width to height ratio is determined for each image and a corresponding facial proportion comparison value is generated based on a standard deviation of these ratios. For example, facial proportions that vary significantly in a sequence of images may indicate that the face in the image sequence does not represent an actual living face positioned in front of the image processing apparatus.

In some alternative implementations, the attribute measured is based on an opening of the mouth. In particular, the system measures variations in the separation of the lips across an image sequence. The standard deviation of these variations can be used to generate a mouth opening comparison value. For example, images where the movement of the mouth is limited may indicate that the face presented to the image processing apparatus does not represent an actual living face.

In some other implementations, the attribute measured is based on eye gaze. Eye gaze direction can be measured independently for each eye, for each image, such that variations in the gaze for a particular eye can be measured across images. One example mathematical formula for generating an eye gaze comparison value is:

$$S_{EG} = \sqrt{[\sigma(EgR_1, EgR_N)^2 - \sigma(EgL_1, EgL_N)^2]}$$

where $\sigma(x_1, x_N)$ is the standard deviation of the range of values from $x_1$ to $x_N$, where $EgL_1$ and $EgL_N$ represent measurements for the left eye in a sequence of N images, and where values $EgR_1$ and $EgR_N$ represent measurements for the right eye in a sequence of N images, and where $S_{EG}$ represents the eye gaze value.

The mathematical formula above can be used to identify cases where eye gaze remains rigid, which can indicate that a picture (e.g., photograph) has been placed in front of the image processing apparatus, and is being bent to simulate an actual living face.

In some alternative implementations, the attribute measured is based on the number of times the eyes blink. Eye blinking can be measured using a sequence of images, where the measurement reflects the extent to which each eye is opened based on the positions of the upper and lower eyelids, for each respective eye. One example mathematical formula for generating an eye blinking comparison value is:

$$S_{EB} = \sum_{k=1}^{N} [IfCount(EoR_k > y, 1, 0) + IfCount(EoL_k > y, 1, 0)]$$

where IfCount(x,1,0) is a function having a value 1 if x is true and a value 0 if x is false, where y is a threshold value above which the eyes are considered open, where $EoL_1$ and $EoL_N$ reflect the extent to which the left eye is open in a sequence of N images, and where values $EoR_1$ and $EoR_N$ reflect the extent to which the right eye is open in a sequence of N images.

The mathematical formula above can be used to identify cases where the eyes in an image sequence remain constant. Eyes that remain constant across an image sequence may indicate that a picture (e.g., photograph) has been placed in front of the image processing apparatus.

The system compares the comparison values generated for the one or more facial features against a predetermined threshold value (530). In some implementations, the comparison value is used to determine whether a face in an image sequence is a picture (e.g., photograph) of a face. In some other implementations, the comparison value is used to determine whether a face in an image sequence is a face of a person actually positioned in front of the camera. In particular, the predetermined threshold value can provide an expected range within which the comparison value for a facial feature should fall within. In some implementations, a threshold value can be predetermined for each facial feature, where the comparison values for each facial feature are measured against a corresponding threshold value for that facial feature. For example, a generated eye distance comparison value may be compared against an eye distance threshold value whereas a generated eye blinking comparison value may be compared against an eye blinking threshold value. In this regard, the use of individual thresholds corresponding to particular facial features can allow greater precision in the image sequence analysis. In some instances, threshold values representing an upper and lower bound can be specified for a facial feature. In some other implementations, threshold values for facial features can be generated using machine learning techniques, where a classifier is trained using a series of facial images to determine optimal threshold values can be optimized to, for example, detect whether a face in an image sequence is a picture or whether a face in an image sequence is a face of a person actually positioned in front of the camera.

The system optionally assigns weights to comparison values for one or more facial features (540). In some implementations, the system can assign weights to comparison values based on how a comparison value ranks in relation to a corresponding threshold value, where the weights are used to determine an overall score. For example, a mouth opening comparison value of 77 in relation to a mouth opening threshold value of 50 may indicate that the opening of the mouth varies considerably across the image sequence. In this example, the mouth opening comparison value serves as a strong indicator of facial movement and is therefore assigned a weight in the overall score calculation. In contrast, a mouth opening comparison value of 22 in relation to a mouth opening threshold value of 50 may indicate that the opening of the mouth does not vary across the image sequence, and therefore should not be assigned a weight in the overall score calculation. The assignment of weights to facial features deemed to be strong indicators of live facial features can be used to increase precision of the facial analysis. In particular, the weighed facial features are used to determine an overall score, where the overall score is compared to a threshold to determine, for example, whether a face in an image sequence is a picture of a face or a face of a person actually positioned in front of the camera. In some other implementations, the weighting of facial features is performed to ensure that the comparison values for each facial feature are given equal importance (e.g., by normalizing each of the comparison values to a scale of between 1 and 100).

The system optionally determines combination weights for two or more facial features (550). In some implementations, a combination weight can be assigned to the overall score computed in operation 540 to increase precision. Combinations of facial features and corresponding combination weights that are particularly relevant in facial analysis can be specified in advance. In some implementations, combinations and corresponding combination weights are determined using machine learning techniques, where a classifier is trained using a series of facial images to determine optimal combinations and corresponding combination weights, where the combinations and corresponding combination weights are optimized to, for example, detect whether a face in an image sequence is a picture or whether a face in an image sequence is a face of a person actually positioned in front of the camera. A combination weight for a given combination of features can be assigned based on how comparison values for features in that combination rank in relation to corresponding threshold values for those features. For example, for a combination consisting of face proportion and eye blinking, in a case where the face proportion value and the eye blinking value both satisfy their corresponding thresholds, a corresponding combination weight can be assigned to the overall score. In contrast, a combination weight is not assigned if any of the facial features in a combination do not satisfy their corresponding thresholds.

The system determines whether a face in an image sequence is a picture or whether a face in an image sequence is a face of a person actually positioned in front of the camera (560). In particular, the system uses the results of the comparison in operation 530 between the comparison values for one or more facial features and corresponding predetermined threshold values to whether a face in an image sequence is a picture or whether a face in an image sequence is a face of a person actually positioned in front of the camera. In some implementations, the system uses the overall score as computed in operations 540 and 550 to determine whether a face in an image sequence is a picture or whether a face in an image sequence is a face of a person actually positioned in front of the camera.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    obtaining training data for training a machine to output a threshold value for each of multiple facial features, the training data including (i) multiple facial images and, (ii) for each facial image, an indication of whether the facial image is of a picture of a person in front of a camera or of a person actually positioned in front of a camera;
    training the machine using the (i) multiple facial images and, (ii) for each facial image, an indication of whether the facial image is of a picture or of a person actually positioned in front of a camera;
    determining, using the trained machine, the threshold value for each of the multiple facial features; and
    using one or more of the threshold values for one or more of the facial features in determining whether one or more subsequently received facial images are of a picture of a person in front of a camera or of a person actually positioned in front of a camera.

2. The method of claim 1, wherein the multiple facial features comprise distance between eyes, face proportion, a size of an opened mouth, a direction of gaze, and rate of blinking.

3. The method of claim 1, wherein determining whether one or more subsequently received facial images are of a picture of a person in front of a camera or of a person actually positioned in front of a camera comprises:
    generating a first facial image and a second facial image of a face using the camera;
    based on the first facial image and the second facial image, determining an aggregate value associated with one or more of the multiple facial features;
    determining that the aggregate value associated with the one or more of the multiple facial features satisfies an aggregate threshold value that is an aggregate of the threshold values of the multiple facial features;
    based on determining that the aggregate value associated with the one or more of the multiple facial features satisfies the threshold value, determining that the first facial image and the second facial image are of a person actually positioned in front of the camera.

4. The method of claim 3, wherein the second facial image is generated less than a particular amount of time after the first facial image is generated.

5. The method of claim 4, wherein the particular amount of time is between one and twenty seconds.

6. The method of claim 3, wherein:
each of the one or more of the multiple facial features is associated with a weight, and
the aggregate value associated with the one or more of the multiple facial features is determined based on each weight associated with a respective facial feature.

7. The method of claim 3, wherein determining an aggregate value associated with one or more of the multiple facial features comprises:
determining the aggregate value based on a respective difference between each facial feature value and a respective facial feature threshold.

8. The method of claim 1, wherein determining whether one or more subsequently received facial images are of a picture of a person in front of a camera or of a person actually positioned in front of a camera comprises:
generating a first facial image and a second facial image of a face using the camera;
based on the first facial image and the second facial image, determining an aggregate value associated with one or more of the multiple facial features;
determining that the value associated with the one or more of the multiple facial features does not satisfy an aggregate threshold value that is an aggregate of the threshold values of the multiple facial features;
based on determining that the value associated with the one or more of the multiple facial features does not satisfy the threshold value, determining that the first facial image and the second facial image are pictures of person in front of the camera.

9. A system comprising:
one or more computers and one or more storage devices storing instructions that are operable, when executed by the one or more computers, to cause the one or more computers to perform operations comprising:
obtaining training data for training a machine to output a threshold value for each of multiple facial features, the training data including (i) multiple facial images and, (ii) for each facial image, an indication of whether the facial image is of a picture of a person in front of a camera or of a person actually positioned in front of a camera;
training the machine using the (i) multiple facial images and, (ii) for each facial image, an indication of whether the facial image is of a picture or of a person actually positioned in front of a camera;
determining, using the trained machine, the threshold value for each of the multiple facial features; and
using one or more of the threshold values for one or more of the facial features in determining whether one or more subsequently received facial images are of a picture of a person in front of a camera or of a person actually positioned in front of a camera.

10. The system of claim 9, wherein the multiple facial features comprise distance between eyes, face proportion, a size of an opened mouth, a direction of gaze, and rate of blinking.

11. The system of claim 9, wherein determining whether one or more subsequently received facial images are of a picture of a person in front of a camera or of a person actually positioned in front of a camera comprises:
generating a first facial image and a second facial image of a face using the camera;
based on the first facial image and the second facial image, determining an aggregate value associated with one or more of the multiple facial features;
determining that the aggregate value associated with the one or more of the multiple facial features satisfies an aggregate threshold value that is an aggregate of the threshold values of the multiple facial features;
based on determining that the aggregate value associated with the one or more of the multiple facial features satisfies the threshold value, determining that the first facial image and the second facial image are of a person actually positioned in front of the camera.

12. The system of claim 11, wherein the second facial image is generated less than a particular amount of time after the first facial image is generated.

13. The system of claim 12, wherein the particular amount of time is between one and twenty seconds.

14. The system of claim 11, wherein:
each of the one or more of the multiple facial features is associated with a weight, and
the aggregate value associated with the one or more of the multiple facial features is determined based on each weight associated with a respective facial feature.

15. The system of claim 11, wherein determining an aggregate value associated with one or more of the multiple facial features comprises:
determining the aggregate value based on a respective difference between each facial feature value and a respective facial feature threshold.

16. The system of claim 9, wherein determining whether one or more subsequently received facial images are of a picture of a person in front of a camera or of a person actually positioned in front of a camera comprises:
generating a first facial image and a second facial image of a face using the camera;
based on the first facial image and the second facial image, determining an aggregate value associated with one or more of the multiple facial features;
determining that the value associated with the one or more of the multiple facial features does not satisfy an aggregate threshold value that is an aggregate of the threshold values of the multiple facial features;
based on determining that the value associated with the one or more of the multiple facial features does not satisfy the threshold value, determining that the first facial image and the second facial image are pictures of person in front of the camera.

17. A non-transitory computer-readable medium storing software comprising instructions executable by one or more computers which, upon such execution, cause the one or more computers to perform operations comprising:
obtaining training data for training a machine to output a threshold value for each of multiple facial features, the training data including (i) multiple facial images and, (ii) for each facial image, an indication of whether the facial image is of a picture of a person in front of a camera or of a person actually positioned in front of a camera;
training the machine using the (i) multiple facial images and, (ii) for each facial image, an indication of whether the facial image is of a picture or of a person actually positioned in front of a camera;
determining, using the trained machine, the threshold value for each of the multiple facial features; and
sing one or more of the threshold values for one or more of the facial features in determining whether one or more subsequently received facial images are of a picture of a person in front of a camera or of a person actually positioned in front of a camera.

18. The medium of claim 17, wherein the multiple facial features comprise distance between eyes, face proportion, a size of an opened mouth, a direction of gaze, and rate of blinking.

19. The medium of claim 17, wherein determining whether one or more subsequently received facial images are of a picture of a person in front of a camera or of a person actually positioned in front of a camera comprises:
   generating a first facial image and a second facial image of a face using the camera;
   based on the first facial image and the second facial image, determining an aggregate value associated with one or more of the multiple facial features;
   determining that the aggregate value associated with the one or more of the multiple facial features satisfies an aggregate threshold value that is an aggregate of the threshold values of the multiple facial features;
   based on determining that the aggregate value associated with the one or more of the multiple facial features satisfies the threshold value, determining that the first facial image and the second facial image are of a person actually positioned in front of the camera.

20. The medium of claim 17, wherein determining whether one or more subsequently received facial images are of a picture of a person in front of a camera or of a person actually positioned in front of a camera comprises:
   generating a first facial image and a second facial image of a face using the camera;
   based on the first facial image and the second facial image, determining an aggregate value associated with one or more of the multiple facial features;
   determining that the value associated with the one or more of the multiple facial features does not satisfy an aggregate threshold value that is an aggregate of the threshold values of the multiple facial features;
   based on determining that the value associated with the one or more of the multiple facial features does not satisfy the threshold value, determining that the first facial image and the second facial image are pictures of person in front of the camera.

\* \* \* \* \*